United States Patent
Watanabe

[15] 3,679,905
[45] July 25, 1972

[54] ELECTRONIC SHUTTER DEVICE COMPRISING LOGARITHMIC-ANTILOGARITHMIC CIRCUITRY

[72] Inventor: Asao Watanabe, Tokyo, Japan
[73] Assignee: Nippon Kogaku K.K., Tokyo, Japan
[22] Filed: March 29, 1971
[21] Appl. No.: 128,871

[30] Foreign Application Priority Data

April 14, 1970 Japan.................................45/31258

[52] U.S. Cl..........................250/206, 95/10 CT, 250/214 P
[51] Int. Cl.......................G01j 1/00, G01j 1/52, H01j 39/12
[58] Field of Search.....................250/214 P, 206; 95/10 CT

[56] References Cited

UNITED STATES PATENTS

| | | |
|---|---|---|
| 3,418,479 | 12/1968 | Schmitt....................................250/206 |
| 3,442,190 | 5/1969 | Erickson..............................250/214 P |
| 3,450,015 | 6/1969 | Reimann et al......................95/10 CT |
| 3,485,152 | 12/1969 | Fuwa...................................95/10 CT |

Primary Examiner—James W. Lawrence
Assistant Examiner—T. N. Grigsby
Attorney—Ward, McElhannon, Brooks & Fitzpatrick

[57] ABSTRACT

The electronic shutter device of this invention has a circuit for generating a voltage whose value is proportional to a logarithm of a magnitude of the current generated by a photosensitive element for sensing the intensity of the light from an object. It is so designed that said voltage generating circuit is used also for a circuit for controlling a shutter speed by the antilogarithmic transformation. Thus the variation in temperature and aging characteristics, which are inherent if the separate circuits were provided, of a logarithmic transformation component can be corrected automatically. Further, an element adopted to store therein the intensity of light from the object is placed in the logarithmic transformation circuit.

1 Claim, 1 Drawing Figure

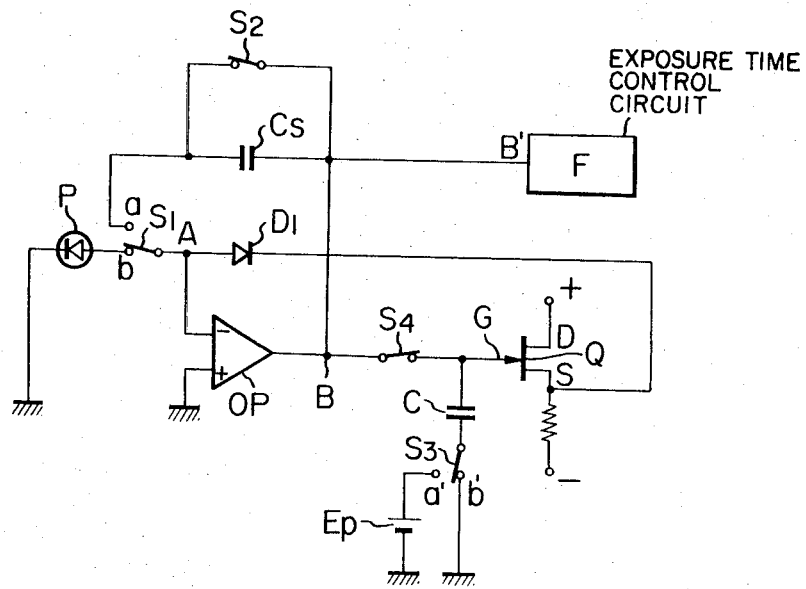

ELECTRONIC SHUTTER DEVICE COMPRISING LOGARITHMIC-ANTILOGARITHMIC CIRCUITRY

BACKGROUND OF THE INVENTION

1. Field of the Invention

The present invention relates to an electronic shutter device.

2. Description of the Prior Art

In the so-called TTL camera, in which the photometry is made for the light passing the objective, having an electronic shutter and especially in a single-lens reflex camera the intensity of light from an object is converted into the electrical signal by means of a photoelectric effect element which is disposed behind a camera lens for intercepting the light rays passed through the camera lens. In order to accomplish an automatic exposure based upon thus generated electrical signal, the intensity of light from the object immediately before a mirror in the camera is moved away from the path of light forming an image of the object upon a film plane, must be temporarily stored or memorized so that an exposure time may be precisely controlled in response to this stored information or electrical signal. For this purpose, there has been proposed a system in which the brightness of light from the object is stored in a memory means such as a capacitor as a signal which may represent a value proportional to a logarithm of the measure intensity of light, and when a shutter is actuated, a shutter actuating signal is derived in the form of a signal whose value is proportional to an exponent of a voltage stored. In this system both of a logarithmic transformation circuit and an antilogarithmic transformation circuit are used, but the complex adjustment is required for matching the characteristics of the two circuits. In addition the characteristics of these circuits are subject to the variation under the temperature change and by aging so that the attainment of the automatic exposure operation with a desired degree of accuracy becomes extremely difficult.

SUMMARY OF THE INVENTION

One of the objects of the present invention is therefore to provide an electronic shutter device which may overcome the problems encountered in the prior art electronic shutter device and which is simple in construction and adjustment and highly reliable in precise operation without being adversely affected by the temperature change and aging.

In brief, the present invention provides an improved electronic shutter device in which a circuit for generating a voltage whose value is proportional to a logarithm of a magnitude of the current generated by a photoelectric effect element for sensing the intensity of light from an object is also used as a circuit for controlling a shutter speed by the antilogarithmic transformation, whereby the variation in temperature and aging characteristics of a logarithmic transformation component part may be automatically corrected and an element adapted to store therein the intensity of light from the object or a signal representative thereof is placed in the logarithmic transformation circuit so as to eliminate the adverse effect of the variation in temperature characteristic and aging upon the memory circuit.

BRIEF DESCRIPTION OF THE DRAWING

The single FIGURE illustrates a circuit diagram of one exemplary embodiment of the present invention.

DESCRIPTION OF THE PREFERRED EMBODIMENT

Referring to the single FIGURE, one terminal of a photocell $p$ is grounded while the other terminal is connected to a fixed contact $b$ of a switch $S_1$ having another fixed contact $a$. A time limit capacitor $Cs$ shunted by a switch $S_2$ has its one terminal connected to the fixed contact $a$ of the switch $S_1$ and the other terminal connected to the output terminal $B'$ and $B$ of an control circuit $F$ and an operational amplifier $OP$. The control circuit $F$ is adapted to control a magnet which in turn actuates a shutter. The positive input terminal $(+)$ of the operational amplifier $OP$ is grounded and the negative input terminal $(-)$ is connected to the movable contact of the switch $S_1$ and to an input terminal of a diode $D_1$ at $A$. The output terminal of the diode $D_1$ is connected to the sources of a field effect transistor $Q$, which is also connected to the negative terminal of a power source $(-)$ through a resistor. The gate $G$ of the field effect transistor $Q$ is connected to the junction $B$ between the time limit capacitor $Cs$ and the operational amplifier $OP$ through a switch $S_4$. The gate $G$ is also connected to a switch $S_3$ through a capacitor $C$. The switch $S_3$ has a fixed contact $b'$ which is grounded and a fixed contact $a'$ which is connected to the positive terminal of another power source $Ep$ whose negative terminal is grounded.

The diode $D_1$, the operational amplifier $OP$, and the field effect transistor $Q$ constitute a logarithmic compression circuit when photometry is made, while this circuit constitutes a logarithmic expansion circuit when exposure time is measured. The capacitor $C$ makes up a memory; the control circuit $F$ is the control circuit for controlling the magnet which in turn actuates the switch; and the selection switches $S_1$ and $S_2$ constitute a selection device.

The current generated by the photocell $p$ is in proportion to the intensity of light incident upon the photocell when the intensity of light from an object is being measured. When the movable contact of the switch $S_1$ remains in contact with the fixed contact $b$, the current $i$ generated by the photocell $p$ is applied to the input terminal of the diode $D_1$ through the junction $A$ to which is connected the negative input terminal of the operation amplifier $OP$. When the input impedance of the operational amplifier $OP$ is made sufficiently higher, the current flow into the amplifier $OP$ may be neglected so that all current $i$ from the photocell $p$ flows into the diode $D_1$.

When the switch $S_4$ is closed, the output of the operational amplifier $OP$ is applied to the gate $G$ of the field effect transistor $Q$. Since the output terminal of the diode $D_1$ is connected to the source $S$ of the field effect transistor $Q$, the latter acts as a source follower which will not cause any phase inversion. Therefore when the input terminal of the operational amplifier $OP$ and the source $S$ of the field effect transistor $Q$ are taken into consideration, they may be considered to constitute an operational amplifier $OP$. The positive input terminal $(+)$ of the operational amplifier $OP$ is grounded while the one terminal of the photocell $p$ is also grounded so that in operation the potential at the negative input terminal $(-)$ of the operational $OP$ is substantially equal to that at the positive terminal $(+)$ as well known in the art. In other words, the potential at the negative input terminal $(-)$ becomes the grounding potential or zero. This means that the current may be derived from the photocell $p$ when it is short-circuited so that a better proportionality in measurement may be attained and that the effect of the dark current due to the reverse bias may be eliminated. As a consequence, the idealized measurement becomes possible.

In case of the measurement, the following relation is held:

$$i = \alpha L \quad (1)$$

where $L =$ Luminous flux or intensity of incident light; and $\alpha =$ a constant of the photocell. Since the potential at the junction or output terminal $A$ is zero and the current $i$ flows into the diode $D_1$, the potential $e$ at the source $S$ of the field effect transistor $Q$ $$e = -Eo \cdot \log(i/Io) \quad (2)$$

where $Eo$ and $Io$ are the constants depending upon the temperature of the diode $D_1$, and $Eo$ is given by $$Eo = 2.303 \, kT/q \quad (3)$$

where $K =$ Boltzman's constant;

$T =$ absolute temperature; and $q =$ charge of electron.

When the fixed contact $b'$ of the switch $S_3$ closed in measurement, the capacitor $C$ is charged to a potential which is the summation of the potential $e$ given by Eq. (2) and the potential difference $e_{GS}$ between the gate and source of the field effect transistor $Q$. That is the capacitor $C$ is charged to a potential given by $$e_c = e + e_{GS} \quad (4).$$

Upon completion of the measurement, the fixed contacts $a$ and $a'$ of the switches $S_1$ and $S_3$ are closed and the switch or contact $S_4$ is opened, but the voltage charged across the capacitor C and given by Eq. (4) remains unchanged as long as the gate current of the field effect transistor Q is sufficiently small. As a consequence, the voltage of the power source $Ep$ is added to the gate voltage $e_G$ of the field effect transistor Q. That is, $$e_G = e_c + Ep$$
$$= e + E_p + e_{GS} \quad (5)$$

Since the filed effect transistor Q is acting as a source follower, the gate-source voltage $e_{GS}$ remains constant so that the potential $e'$ at the source S of the field effect transistor $q$ is given by $$e' = e_G - e_{GS} \quad (6)$$

Substituting Eq. (6) into Eq. (5), we have $$e' = e + Ep \quad (7)$$

In this case, the positive input terminal (+) of the operational amplifier OP is grounded so that the potential at A is zero. As a consequence the potential $e'$ given by Eq. (7) is added to the diode $D_1$. From Eq.(2) expressing the general diode equation, the current $i'$ flowing into the diode $D_1$ from the junction A is $$e' = Eo \cdot \log(i'/Io) \quad (8)$$

or $$i' = Io \cdot 10^{-e'/Eo} \quad (8')$$

Substituting Eq.(8') into Eq.(7), we have $$i' = Io \cdot 10^{-e/Eo} \cdot 10^{-Ep/Eo} \quad (9)$$

Since Eq.(2) may be rewritten into $$i = Io \cdot 10^{-e/Eo} \quad (10)$$

Eq.(9) may be rewritten as $$i' = i \cdot 10^{+Ep/Eo} \quad (11)$$

Since the fixed contact $a$ of the switch $S_1$ is closed, the circuit functions as an integration circuit. That is, when the contact $S_2$ is opened at the initiation of the shutter actuation, the current $i'$ from the output terminal B of the operational amplifier OP flows into the diode $D_1$ through the capacitor Cs, but the potential at the junction A remains zero unless the operational amplifier is saturated. As a consequence, the potential $e_B$ at the junction B becomes proportional to time $t$ and is given by $$e_B = i' \cdot t / Cs \quad (12)$$

The potential at the input terminal B' of the control circuit F is maintained at the same potential level as that at the point B and the shutter is adapted to close when the potential $e_B$ at the input terminal B becomes a prescribed potential level $e_{Bo}$. The time interval to or shutter actuating time required for the potential $e_B$ at the input terminal B' to reach the prescribed level $e_{Bo}$ is given by $$e_{Bo} = i' \cdot to / Cs \quad (13)$$

Substituting Eq.(13) into Eq.(11), we have $$to \cdot i \cdot 10^{-Ep/Eo} = e_{Bo} \cdot Cs = \text{constant} \quad (14)$$

Substituting Eq.(1) into Eq.(14), we have $$to \cdot L / 10^{Ep/Eo} = E_{Bo} \cdot Cs / \alpha = \text{constant} \quad (15)$$

From the foregoing description, it is seen that by a suitable selection of the voltage of the power source $Ep$, an aperture stop or film sensitivity or speed may be set and the conditions for actuating the shutter (precisely in response to the intensity of the object) may be satisfied. Inspection of Eq.(15) makes it clear that only $Eo$ of the temperature-responsive constants $Eo$ and $Io$ of the diode $D_1$ is not included in Eq.(15). That is, the constant $Io$ which is especially influenced by the temperature variation and aging is eliminated.

The corelation among the voltage of the power source Ep, a magnification factor $K$ per one step of the stop values and a number of steps $n$ may be given by $$K^n = 10^{Ep/Eo} \quad (16)$$

or $$Ep = n \cdot Eo \cdot \log K \quad (16')$$

From Eq. (16'), it is seen that the voltage $Ep$ is explicitly in proportion to the number of steps $n$. This means that a setting may be easily made.

The operational amplifier OP used in the instant embodiment may be made up in a simple manner as a two-stage differencial amplifier having two field effect transistors as it's input stage. It is of course possible to use a photoconductive cell or the like together with a suitable power or bias source instead of the photocell $p$ of the type described above. The reference power source $Ep$ can be connected equivalently in series with the diode $D_1$ by connecting the power source $Ep$ in opposite phase to the positive input terminal (+) of the operational amplifier. Instead of the diode $D_1$, any other suitable element such as a transistor may be employed. In addition in place of the source follower a simple field effect transistor input type amplifier may be used. In the instant embodiment, the reference or correction voltage power source Ep has been described as being connected in series to the capacitor C, but it is understood that the reference voltage $Ep$ may be intervened in opposite phase between the capacitor C and the ground during the measuring operation and may be isolated when the shutter is actuated.

From the foregoing description, it is seen that the present invention may eliminate the complex adjustment for matching the characteristics of the logarithmic transformation circuit and the circuit for performing the antilogarithmic transformation. The electronic shutter in accord with the present invention is simple in construction and adjustment and is less affected by the temperature change and aging.

I claim:

1. An electronic shutter device of the type comprising a circuit for performing a logarithmic transformation of the output variation of a photoelectric effect element which senses light from an object to be photographed, a memory means for storing the output from said logarithmic transformation circuit, a circuit for performing the antilogarithmic transformation of the output from said memory means, a control circuit for controlling an exposure time in response to the output of said antilogarithmic transformation circuit and a switching means adapted to selectively switch said logarithmic transformation circuit so as to be used as said antilogarithmic transformation circuit.

* * * * *